United States Patent
Matsuda et al.

[11] Patent Number: 6,163,741
[45] Date of Patent: Dec. 19, 2000

[54] SYSTEM FOR DETERMINING PASSABILITY OF VEHICLE

[75] Inventors: Shohei Matsuda; Yuji Sakaki; Makoto Otabe, all of Saitama, Japan

[73] Assignee: Honda Giken Kogyo Kabushiki Kaisha, Tokyo, Japan

[21] Appl. No.: 09/056,245

[22] Filed: Apr. 7, 1998

[30] Foreign Application Priority Data

Apr. 8, 1997 [JP] Japan .................................. 9-089662
Apr. 8, 1997 [JP] Japan .................................. 9-089663

[51] Int. Cl.[7] .................................................. G06F 165/00
[52] U.S. Cl. ............................ 701/1; 701/208; 340/438; 340/905
[58] Field of Search .................................. 701/1, 36, 41, 701/43, 48, 70, 72, 80, 93, 97, 200, 207, 208, 213; 340/425.5, 438, 440, 441, 466, 467, 470, 471, 905; 342/357.09, 357.1, 357.12, 357.13, 357.14, 357.17, 385, 386

[56] References Cited

U.S. PATENT DOCUMENTS 5,539,397  7/1996  Asanauma et al. ..................... 340/901
5,546,311  8/1996  Sekine ..................................... 701/208
5,661,650  8/1997  Sekine et al. ............................ 701/82

FOREIGN PATENT DOCUMENTS 5-141979  6/1993  Japan .
8-147598  6/1996  Japan .

Primary Examiner—William A. Cuchlinski, Jr.
Assistant Examiner—Edward Pipala
Attorney, Agent, or Firm—Carrier, Blackman & Associates, P.C.; Joseph P. Carrier; William D. Blackman

[57] ABSTRACT

A system for determining the passability of a vehicle passing through a curved road section. The system provides road information, detects the position of a subject vehicle on the road and determines whether a node, representing road data, exists on a curved or straight section of road. If it is determined that the node exists on a curve, it is then determined whether the curve is a simple curve or an S-shaped curve. Based upon these determinations, the system determines whether the vehicle can safely pass through the curve.

14 Claims, 13 Drawing Sheets

SYSTEM FOR DETERMINING PASSABILITY OF VEHICLE

BACKGROUND OF THE INVENTION

1. Field of the Invention

The present invention relates to a system for determining the passability of a vehicle, which involves perceiving a shape of a road based upon map data comprised of an aggregation of a plurality of nodes and determining whether the vehicle can safely pass through the nodes.

2. Description of the Related Art

A system for determining the passability of a vehicle is known from Japanese Patent Application Laid-open No. 5-141979, wherein a radius of curvature of a curved section of a road is presumed by calculating a radius of an arc passing through three nodes, a passable speed of the vehicle is calculated based on the radius of curvature of the curved road section, a passage-predicting speed of the vehicle is calculated based on a current vehicle speed, and the passable vehicle speed is compared to the passage-predicting speed of the vehicle. If the passage-predicting speed is equal to or lower than the passable speed, it is determined that the vehicle can safely pass through the curve.

In the known system identified above, if three nodes $N_1$, $N_2$ and $N_3$ exist on the same curve, as shown in FIG. 12A, a radius R of the curve can be correctly presumed. However, the above conventional system suffers from the following problem: if middle node $N_2$ exists on a curve and leading node $N_1$ and trailing node $N_3$ are out of the curve, as shown in FIG. 12B, a radius R' of curvature of the curve presumed from the three nodes $N_1$, $N_2$ and $N_3$ is larger than an actual radius R of curvature of the curve, thereby incorrectly calculating the shape of the curve.

In cases of simple curves having a constant radius of curvature (curves whose direction of curvature does not change from the curve inlet to curve outlet), it is more difficult for a vehicle to pass through the curve b having a longer curved-section than through the curve a having the same radius of curvature but a shorter curved-section, as shown in FIG. 13A. In cases of curves having a constant radius of curvature, it is more difficult for a vehicle to pass through an S-shaped curve (curve c, whose curving direction changes from the right to the left or from the left to the right) than through the simple curve having the same radius of curvature (curve b, as shown in FIG. 13B). Namely, the passable speeds for a vehicle passing through the curves are such the speed through curve a is greater than the vehicle speed through curve b which is greater than vehicle speed through curve c. In the above-identified, known system, however, if the radii of curvature of curves a, b and c are equal to each other, the passable speeds through the curves are computed to be equal to each other. For this reason, it is difficult to accurately determine whether the vehicle can pass through a curve based upon the shape and type of the curve.

SUMMARY OF THE INVENTION

Accordingly, it is a first object of the present invention to accurately determine whether the vehicle can pass through a curved section of a road based upon the curved shape of the road.

It is a second object of the present invention to accurately determine whether the vehicle can safely pass through a curved section of a road by correcting the passable speed of the vehicle in accordance with the curved shape of the road.

To achieve the first object, according to a first preferred embodiment of the present invention, there is a disclosed a system for determining the passability of a vehicle, comprising map information outputting means for outputting a map information as an aggregation of a plurality of nodes constituting a road section, subject-vehicle position detecting means for detecting a position of a subject vehicle on a map, road-shape determining means for determining the shape of a road based upon a node immediately ahead of the subject vehicle position; and passability determining means for determining whether the vehicle can pass through the node, based upon the determined shape of the road. The road-shape determining means includes first determining means for determining whether the node exists on a curve or on a straight section of road, second determining means for determining whether another node exists on the curve; third determining means for determining whether the curve is a simple curve or an S-shaped curve, and fourth determining means for determining whether the curve is an S-shaped curve, when it is determined by the second determining means that the node exists alone on the curve.

With the above arrangement, the first determining means determines whether the node exists on a curve or on a straight road. If it is determined that the node exists on the curve, the second determining means then determines if more than one nodes exist on the curve. The third determining means determines whether the curve is a simple curve or an S-shaped curve. If it is determined that the node exists on a curve and that only one node exists on the curve by the second determining means, the fourth determining means determines whether the curve is an S-shaped curve or two curves connected to opposite ends of a straight road. By finely perceiving the shape of the road in this manner, the determination of the passability of the vehicle can be precisely performed.

To achieve the second object, according to a second aspect and feature of the present invention, there is provided a system for determining the passability of a vehicle, comprising map information outputting means for outputting map information as an aggregation of a plurality of nodes constituting a road section, subject vehicle position detecting means for detecting a position of a subject vehicle on a map, road-shape determining means for determining a shape of a road based on the arrangement of nodes ahead of the subject vehicle position, passable speed calculating means for calculating a passable speed for the vehicle to pass through the nodes ahead of the subject vehicle position, passability determining means for determining whether the vehicle can pass through the nodes, based on the calculated passable speed, and correcting means for correcting the passable speed, when the determined shape of the road is a simple curve, based on a sum total of variation in azimuth angle of the vehicle from an inlet to an outlet on the simple curve.

With the above arrangement, when it is determined by the road-shape determining means that the shape of the road ahead of the subject vehicle position is a shape of a simple curve, the passable speed calculated by the passable-speed calculating means is corrected based on the sum total of the variation in azimuth angle of the vehicle from the inlet to the outlet of the curve. Therefore, it is possible to perform a precise determination of the passability of the vehicle through the simple curve.

To achieve the above second object, according to a third aspect and feature of the present invention, there is provided a system for determining the passability of a vehicle, comprising map information outputting means for outputting map information as an aggregation of a plurality of nodes constituting a road section, subject vehicle position detecting means for detecting a position of a subject vehicle on a map, road-shape determining means for determining a shape of a road based on the arrangement of nodes ahead of the subject vehicle position, passable speed calculating means for calculating a passable speed for the vehicle to pass through the node ahead of the subject vehicle position, passability determining means for determining whether the vehicle can pass through the nodes, based on the calculated passable speed, and correcting means for correcting the calculated passable speed, when the determined shape of the road is an S-shaped curve.

With the above arrangement, when it is determined by the road-shape determining means that the shape of the road ahead of the subject vehicle is an S-shaped curve, the passable speed calculated by the passable-speed calculating means is corrected. As a result, it is possible to perform a more precise determination of the passability of the vehicle through the S-shaped curve.

For purposes of this application, a simple curve is defined as a curve whose curving direction does not change to the right or the left from the inlet to the outlet of the curve. An S-shaped curve is defined as a curve whose direction of curvature changes from the right to the left or from the left to the right between the inlet and the outlet of the curve.

The above objects, features and advantages of the present invention will become apparent from the following detailed description of the preferred embodiments taken in conjunction with the accompanying drawings.

BRIEF DESCRIPTION OF THE DRAWINGS

FIGS. 1 to 11B illustrate a preferred embodiment of the present invention, wherein FIG. 1 is a block diagram illustrating the present system according to the embodiment of the present invention;

FIG. 2 is a flow chart for explaining a function of road shape determining means;

FIG. 3 is a diagram explaining a pre-reading section and a searching section utilized by the present system;

FIG. 4 is a first portion of a flow chart illustrating the operational steps of the present system;

FIG. 5 is a second portion of the flow chart;

FIG. 6 is a third portion of the flow chart;

FIG. 7 is an illustration for explaining link length $I_N$ and crossed axes angle $\theta_N$;

FIGS. 11A and 11B are illustrations of maps for searching correcting factors $K_C$ and $K_S$;

DETAILED DESCRIPTION OF THE PREFERRED EMBODIMENT

The present invention will now be described by way of a preferred embodiment with reference to FIGS. 1 to 11B.

Figure 1:
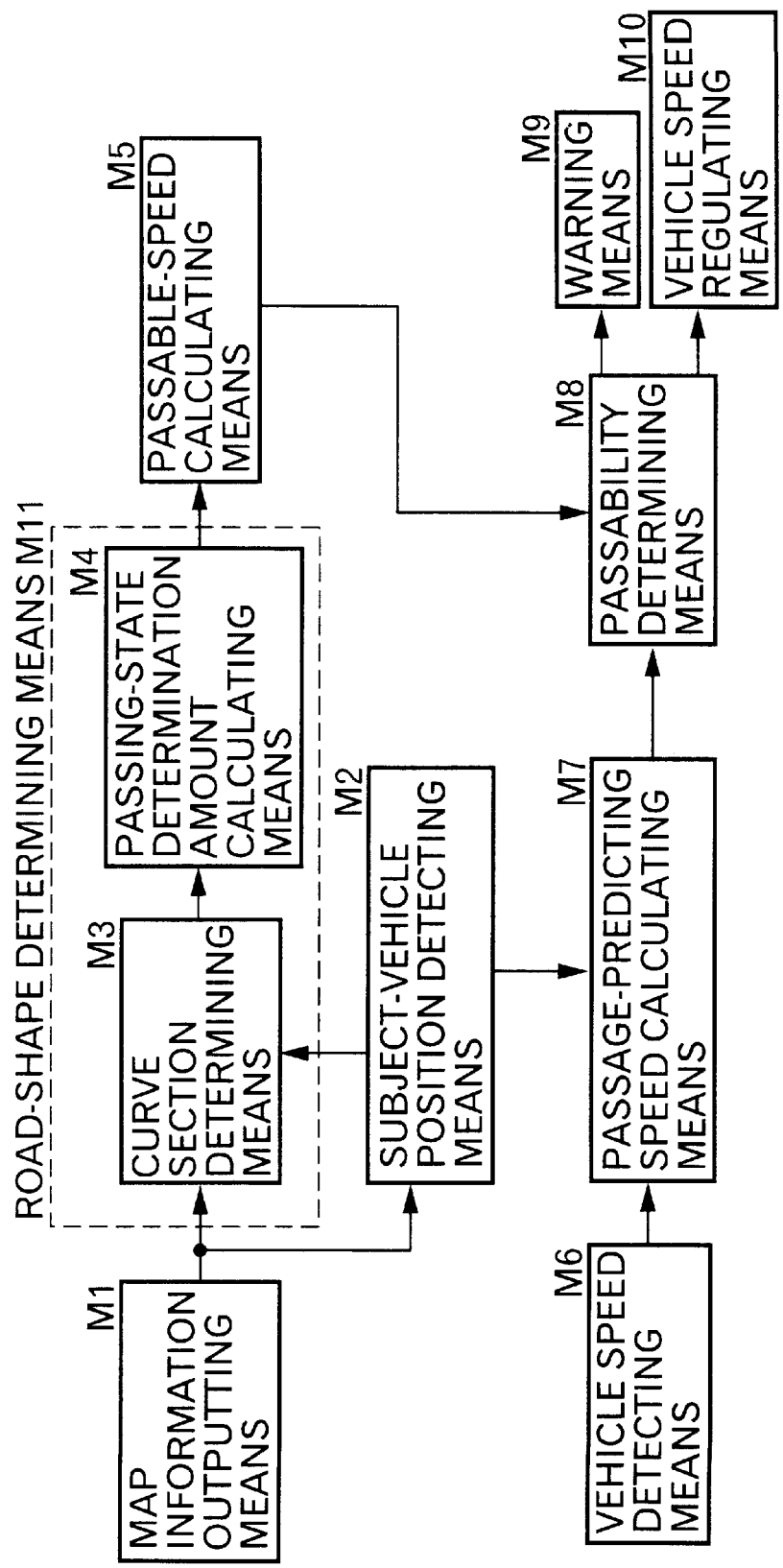

Referring to FIG. 1, a system for determining whether a vehicle can pass, according to the present invention includes map information outputting means M1, subject-vehicle position detecting means M2, curve-section determining means M3, passing-state determination-amount calculating means M4, passable-speed calculating means M5, vehicle speed detecting means M6, passage-predicting speed calculating means M7, passability determining means M8, vehicle control warning means M9, and vehicle speed regulating means M10. The curve-section determining means M3 and the passing-state determination-amount calculating means M4 constitute road-shape determining means M11.

The map information outputting means M1 and the subject-vehicle position detecting means M2 are mounted in a known navigation system for a motor vehicle. The map information outputting means M1 reads and outputs road data in a predetermined range previously stored on an IC card, a CD-ROM, a photo-magnetic disk or other device on which data can be rewritten. The subject-vehicle position detecting means M2 detects the position of the subject vehicle on a map by superposing subject-vehicle data received from a GPS transmission. The road data is comprised of a large number of nodes $N_N$ established at predetermined distances along a road.

Figure 2:
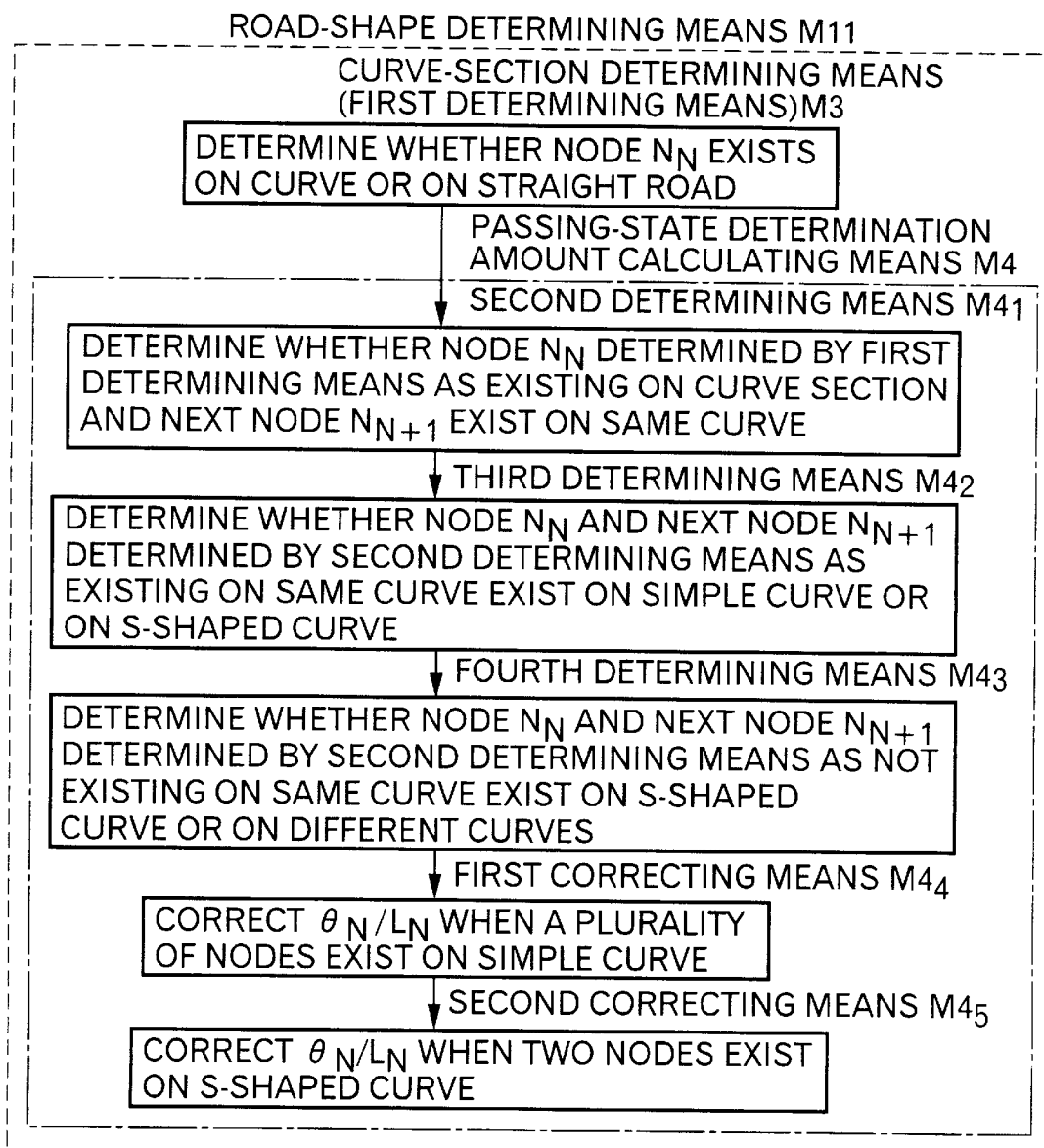

As can be seen from FIG. 1 in combination with FIG. 2, the curve-section determining means M3 includes first determining means for determining whether a node $N_N$ ahead of the position P of the subject vehicle exists on a curve or on a straight road section, based on the road data and the position P of the subject vehicle. The passing-state determination-amount calculating means M4 includes second determining means $M4_1$ whose contents will be described hereinafter, third determining means $M4_2$, fourth determining means $M4_3$, first correcting means $M4_4$ and second correcting means $M4_5$. The passing-state determination amount calculating means M4 calculates a passing-state determination amount $\theta_N/L_N$ which is used in determining whether the vehicle can pass through a curve.

The passable-speed determining means M5 calculates a passable speed $V_{maxN}$ which is a maximum vehicle speed at which the vehicle can pass safely through the node $N_N$, based on the passing-state determination amount $\theta_N/L_N$ and a preset lateral acceleration limir G (or yaw rate limit YR) previously set at a value at which a driver can drive the vehicle to safely pass through a curve.

The vehicle speed detecting means M6 detects a current vehicle speed V of the subject vehicle based on output generated by wheel speed sensors mounted on the vehicle wheels. The passage-predicting speed calculating means M7 calculates a passage-predicting speed $V_N$ at which the vehicle will pass through the node $N_N$, based on the vehicle speed V, the position P of the subject vehicle and a reference deceleration value $\beta$ previously set for the vehicle. The passability determining means M8 compares the passage-predicting speed $V_N$ with the passable speed $V_{maxN}$. If $V_N \leq V_{maxN}$, then it is determined that the vehicle can pass through the node $N_N$, and if $V_N > V_{maxN}$, then it is determined that it is difficult for the vehicle to pass through the node $N_N$, at which point the warning means M9 comprising a buzzer or a lamp is activated to alert the driver to decelerate the vehicle, and the vehicle speed regulating means M10 comprising automatic brake means or engine output reducing means is operated to automatically decelerate the vehicle.

Figure 3:
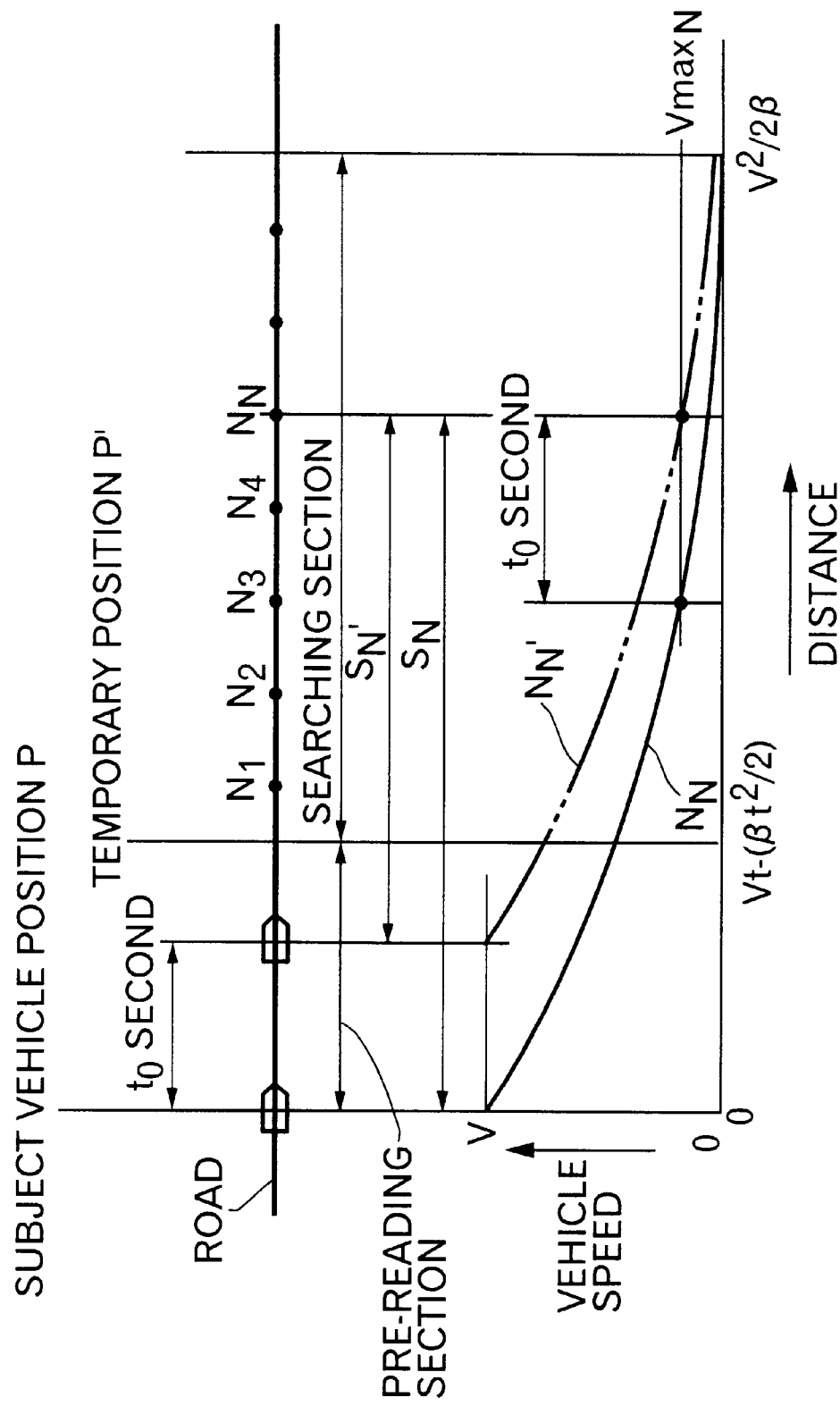

As shown in FIG. 3, a pre-reading section and a searching section are established on a road ahead of the position P of the subject vehicle. The pre-reading section is established between the position P of the subject vehicle and the node $N_N$ through which it is determined that the vehicle can pass, in order to ensure a predetermined time t exists until the vehicle passes through the pre-reading section and reaches the node $N_N$. The pre-reading section thereby allows for a sufficient time to determine the passability of the vehicle and to operate the warning means M9 and the vehicle speed regulating means M10. The searching section is established for determining whether the vehicle can pass through the node $N_N$ existing within the searching section. Thus, determinations of vehicle passability through distant nodes $N_N$ far ahead of the searching section are avoided.

The pre-reading section is determined by a distance $Vt-(\beta t^2/2)$ through which the vehicle travels within the predetermined time t, wherein $\beta$ represents a previously set reference deceleration rate or value which is presumed to be generated by braking action spontaneously initiated by the driver at the position P of the subject vehicle in order to allow the vehicle to pass through a curie ahead of the subject vehicle. A starting point of the searching section is established at a terminal end of the pre-reading section, and a terminal end of the searching section is set at a location at which the vehicle, which decelerated at the reference deceleration rate $\beta$, is stopped, i.e., at a location spaced apart from the subject vehicle position P by a distance $V^2/2\beta$.

Figure 4:
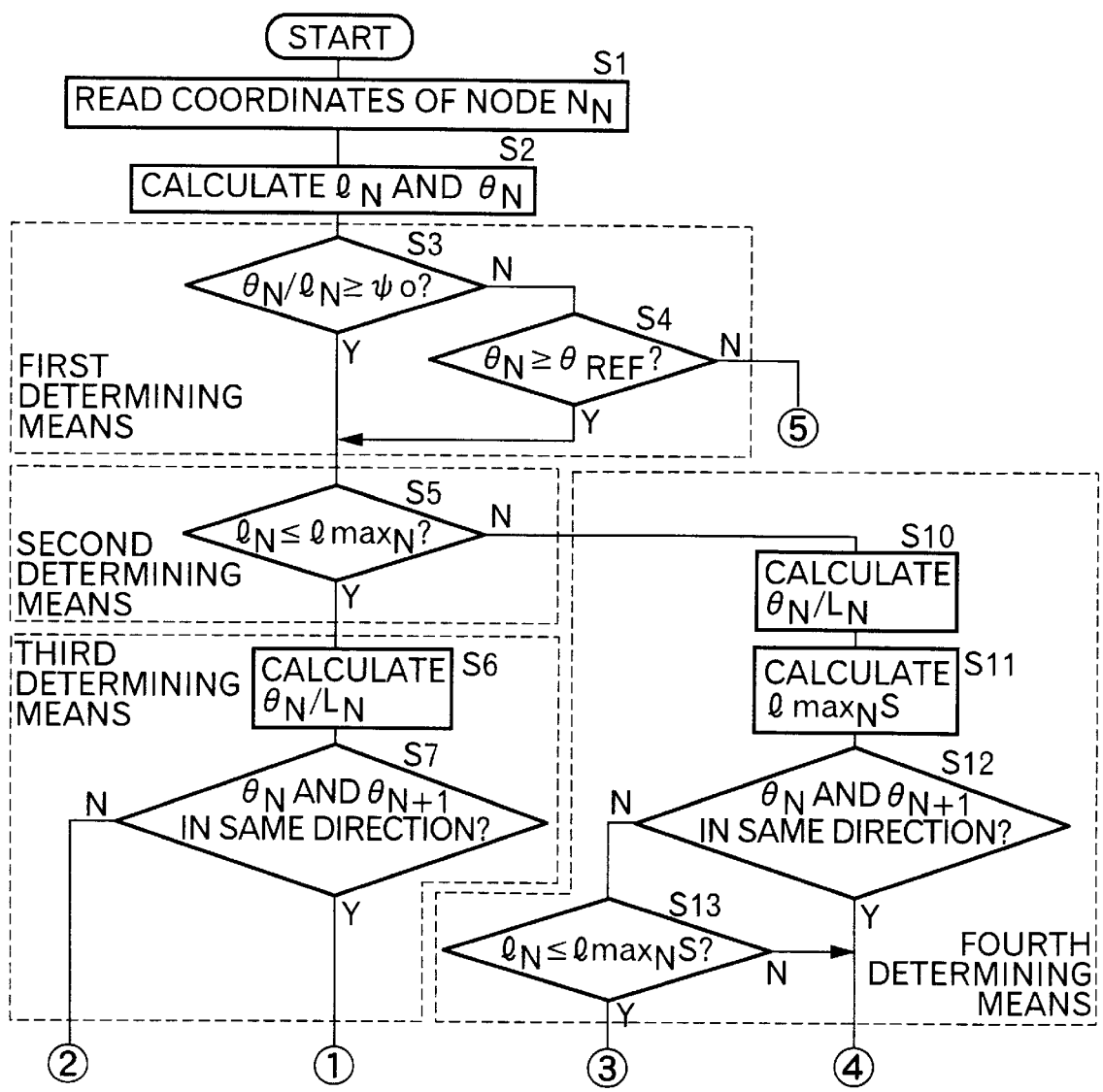
Figure 5:
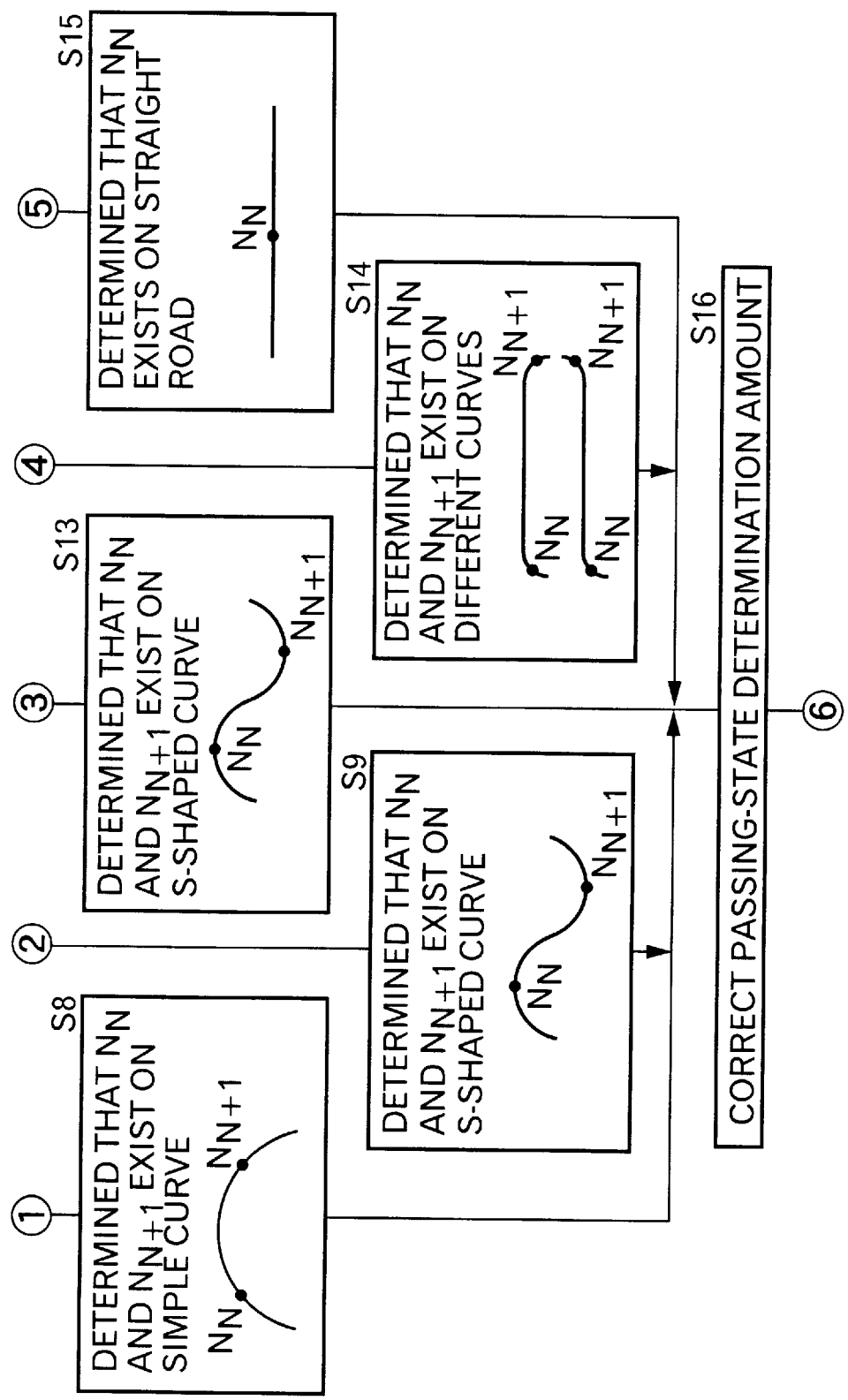
Figure 6:
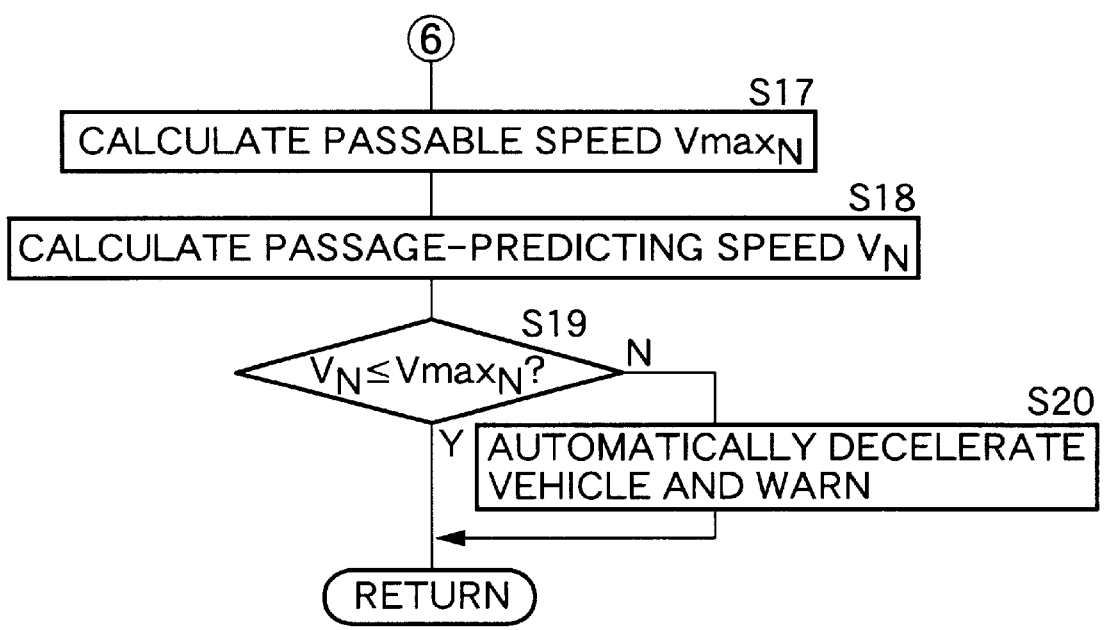

The operation of the embodiment of the present invention will be described below with reference to flow charts in FIGS. 4 to 6.

Figure 7:
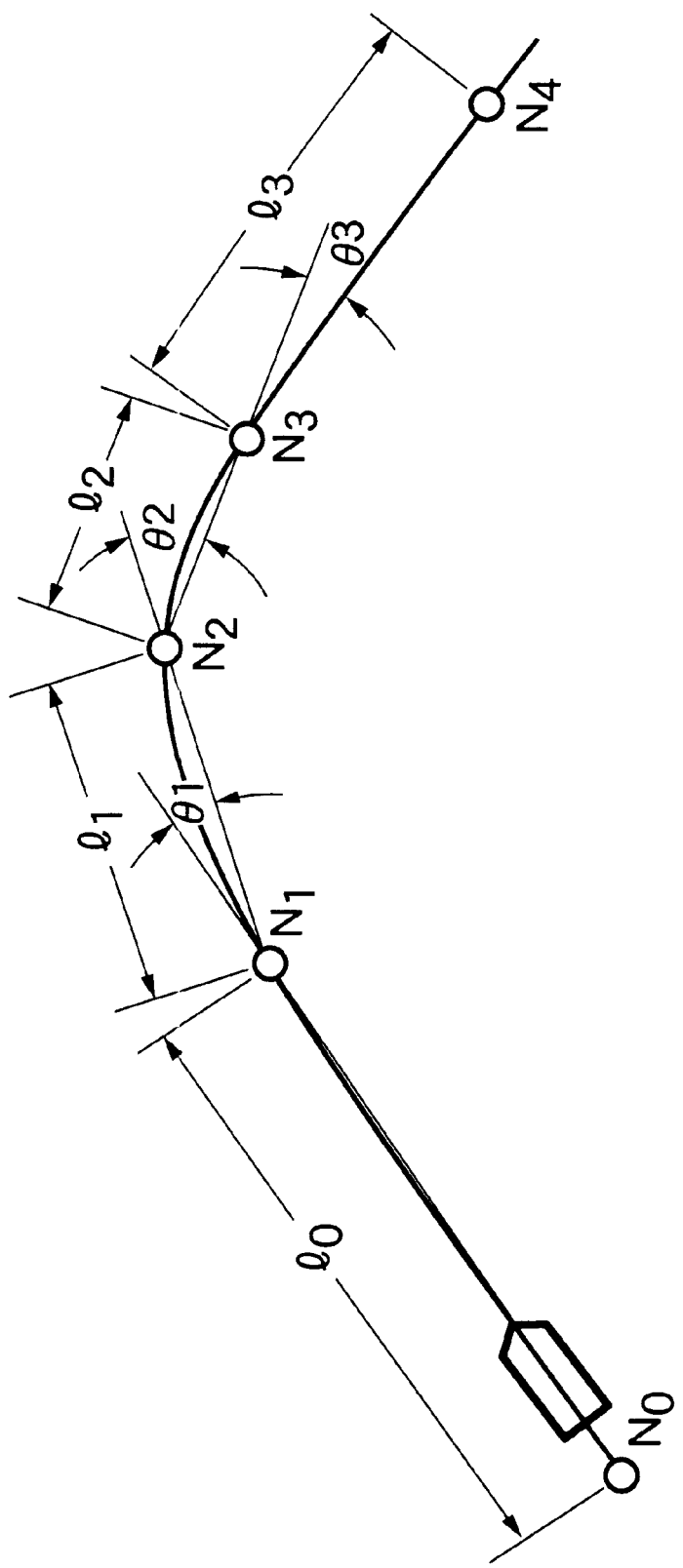

First, at step S1, coordinate points of a plurality of nodes $N_N$ ($N_N=N_1, N_2, N_3 ---$) existing in the searching section are read, and at step S2, a link length $1_N$ and a crossed axes angle $\theta_N$ at each of the nodes $N_N$ are read. As shown in FIG. 7, the link length $1_N$ is defined as a distance between adjacent nodes $N_N$ and $N_{N+1}$, and the crossed axes angle $\theta_N$ is defined as an angle formed between a link $N_{N-1}N_N$ and link $N_N N_{N+1}$ located ahead of the link $N_{N-1}N_N$. The link length $1_N$ and the crossed axes angle $\theta_N$ can be geometrically calculated from the fact that the position of each of the nodes $N_N$ is provided by the coordinates.

Next, the first determining means of curve section determining means M3 determines whether the node $N_N$ exists on a curve or on a straight road, as shown in FIG. 2. This determination is performed by calculating $\theta_N/1_N$ at each of the nodes $N_N$ at step S3 and comparing the $\theta_N/1_N$ with a previously set first determining reference value $\phi_{ref}$. If $\theta_N/1_N \geq \phi_{ref}$, then it is determined that the node $N_N$ exists on a curve, thereby proceeding to step S5. The $\theta_N/1_N$ corresponds to an amount of variation in azimuth angle of the vehicle relative to the distance of movement of the vehicle. A larger value of $\theta_N/1_N$ indicates that the road is curved, and a smaller value of $\theta_N/1_N$ indicates that the road is straight.

Even if $\theta_N/1_N<\phi_{REF}$ at step S3, the crossed axes angle $\theta_N$ is compared with a second determining reference value $\theta_{REF}$. If $\theta_N \geq \theta_{REF}$, i.e., if the crossed axes angle $\theta_N$ itself is equal to or larger than the second determining reference value $\theta_{REF}$, it is determined that the road is curved, and the system proceeds to step S5. On the other hand, if $\theta_N/1_N<\phi_{REF}$ at step S3 and $\theta_N<\theta_{REF}$ at step S4, it is determined at step S15 that the road is straight. When the road is straight, a passing-state determination amount $\theta_N/L_N$, which will be described hereinafter, is set at zero.

If it is determined by the curve section determining means (the first determining means) M3 that the node $N_N$ exists on the curve, it is determined by the second determining means $M4_1$ whether two consecutive nodes $N_N$ and $N_{N+1}$ exist on the same curve. The determination by the second determining means $M4_1$ is carried out by comparing the link length $I_N$ between the nodes $N_N$ and $N_{N+1}$ with a third determining reference value $I_{maxN}$ at step S5. If $I_N \leq I_{maxN}$, it is determined that the nodes $N_N$ and $N_{N+1}$ exist on the same curve, proceeding to step S6. If $I_N > I_{maxN}$, it is determined that the nodes $N_N$ and $N_{N+1}$ do not exist on the same curve, and the system proceeds to step S10.

Figure 8A:
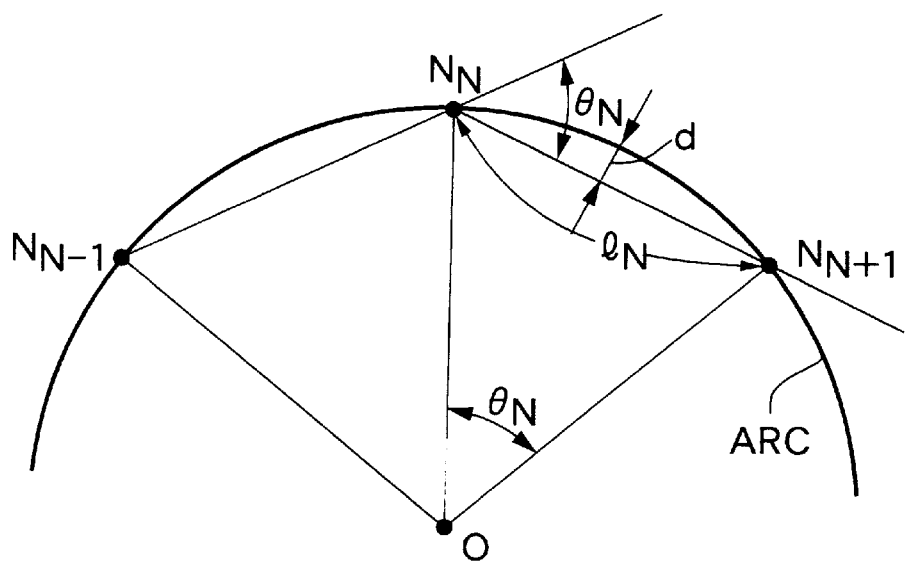
FIGS. 8A and 8B are illustrations for explaining step S5 in the flow chart.
Figure 8B:
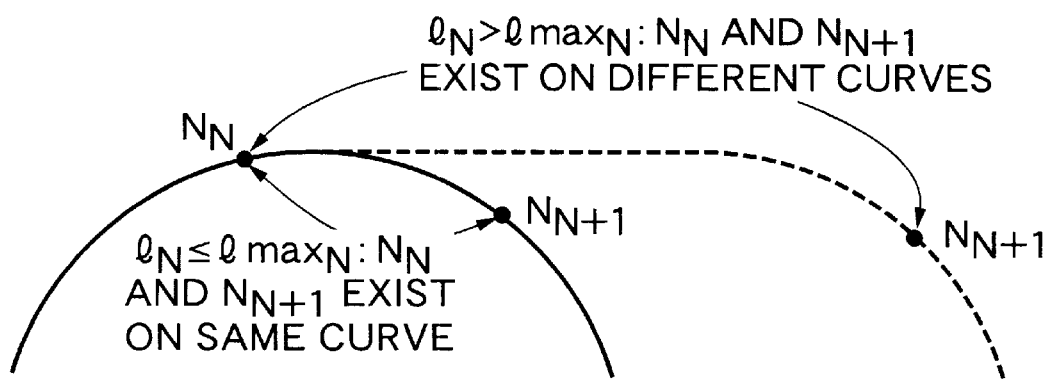

Step S5 will be described below with reference to FIGS. 8A and 8B. FIG. 8A shows a state in which three nodes $N_{N-1}$, $N_N$ and $N_{N+1}$ are arranged along the same arcuate path about a center O, as a representative example of a common curve. The crossed axes angle $\theta_N$ at the node $N_N$ is equal to a center angle $<N_N O N_{N+1}$ of the arc and hence, the link length $I_N$ between the node N and $N_{N+1}$ is given according to $$I_N = 2d/\tan(\theta_N/4) \quad (1)$$

wherein d is a sag between the nodes $N_N$ and $N_{N+1}$.

The sag d is a value which is a criterion for determining the distance (i.e., the link length $I_N$) between the adjacent nodes $N_N$ when data for a road map are made. By determining the position of each node $N_N$ so that the sag d is equal to or smaller than a predetermined value (such as between approximately 3.5 m to 6 m), the shape of a road is expressed by a minimum number of nodes $N_N$. As a result, nodes $N_N$ are densely disposed such that the link length $I_N$ between adjacent nodes $N_N$ is smaller in a sharp curve. Nodes $N_N$ are disposed roughly along a less sharp curve such that the link length $I_N$ between the adjacent nodes $N_N$ is larger.

Thus, the third determining reference value $I_{maxN}$ is defined as a maximum link length according to $$I_{maxN} = 2d/\tan(\theta_N/4) \quad (2)$$

and if $I_N \leq I_{maxN}$ is established at step S5, it is determined that the nodes $N_N$ and $N_{N+1}$ exist on the same curve. If $I_N \leq I_{maxN}$ is not established, it is determined that the nodes $N_N$ and $N_{N+1}$ exist on different curves (see FIG. 8B).

If it is determined in the second determining means $M4_1$ that the nodes $N_N$ and $N_{N+1}$ exist on the same curve, then passing-state determination amounts $\theta_1/L_1 \ldots \theta_N/L_N$ of an N number of nodes $N_1 \ldots N_N$ existing on the same curve are determined at step S6 in the following manner. For a first N-1 number of nodes $N_1$ to $N_{N-1}$, passing-state determination amounts $\theta_K/L_K$ (K=1 to N-1) are determined according to $$\theta_K/L_K \leftarrow \theta_K/I_K$$

A passing-state determination amount $\theta_N/L_N$ of a final N-th node $N_N$ is determined according to $$\theta_N/L_N \leftarrow \theta_N/(I_{N-1} \text{ or a shorter value of } I_{maxN}) \quad (4)$$

wherein $I_{maxN}$ is equal to $2d/\tan(\theta_N/4)$ defined in the equation (2).

Figure 9A:
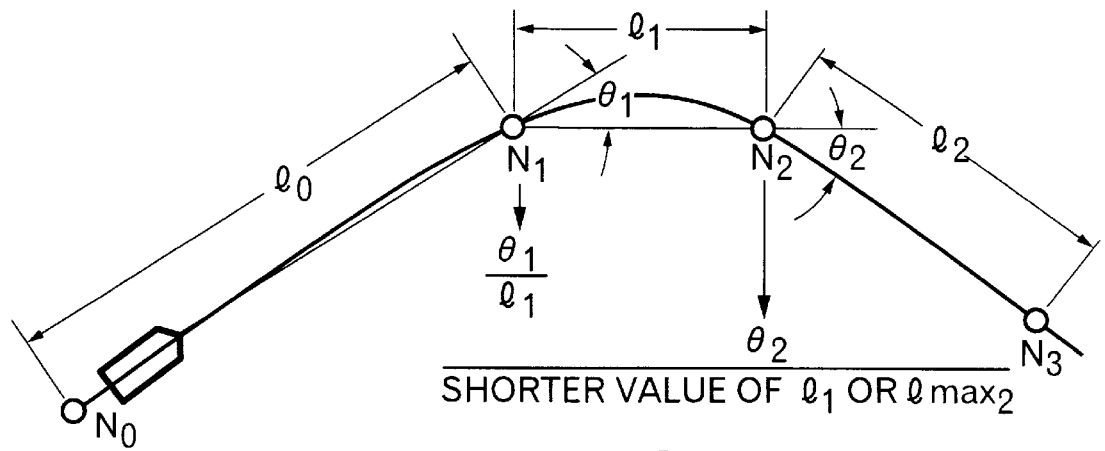
FIGS. 9A, 9B and 9C are illustrations for explaining the definition of a passing-state determination amount $\theta_N/L\theta_N$.
Figure 9B:
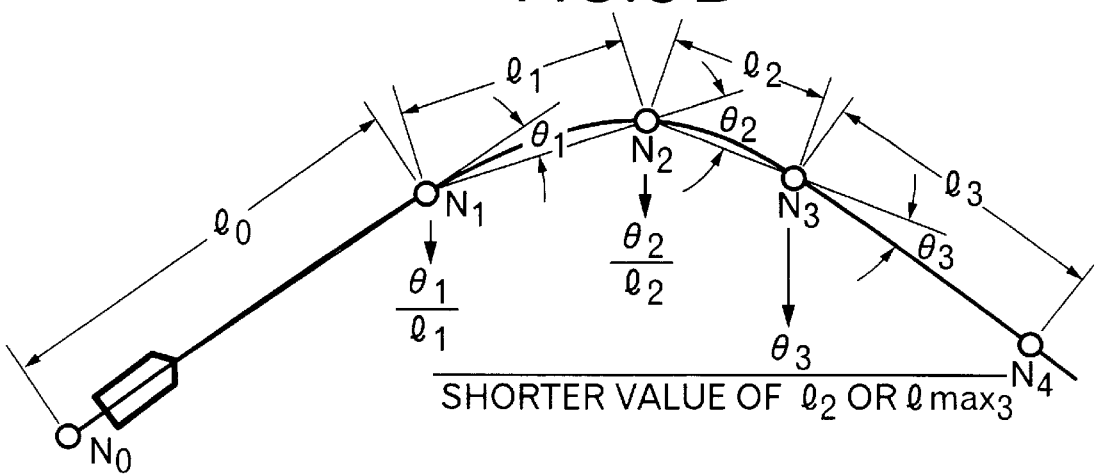

Specifically, when two consecutive nodes $N_1$ and $N_2$ exist on the same curve, as shown in FIG. 9A, a passing-state determination amount $\theta_1/L_1$ for the first node $N_1$ is determined as $\theta_1/I_1$, and a passing-state determination amount $\theta_2/L_2$ for the second (last) node $N_2$ is determined as $\theta_2/(I_2$ or a shorter value of $I_{max2})$. When three consecutive nodes $N_1, N_2$ and $N_3$ exist on the same curve, as shown in FIG. 9B, passing-state determination amounts $\theta_1/L_1$ and $\theta_2/L_2$, respectively, for the first and second nodes $N_1$ and $N_2$ are determined as $\theta_1/I_1$ and as $\theta_2/I_2$, and a passing-state determination amount $\theta_3/L_3$ for the third node $N_3$ is determined as $\theta_3/(I_2$ or a shorter value of $I_{max3})$.

The last node $N_N$ of a plurality of consecutive nodes $N_1, \text{---} N_N$ on the same curve can be determined at the time when the answer at step S5 is changed from YES to NO.

The direction of the crossed axes angle $\theta_N$ of the node $N_N$ is compared with the direction of the crossed axes angle $\theta_N$ of the node $N_{N+1}$ at subsequent step S7. If these directions are the same, it is determined at step S8 that the two nodes $N_N$ and $N_{N+1}$ exist on a simple curve (a curve having a constant curving direction). If the directions are opposite, it is determined at step S9 that the two nodes $N_N$ and $N_{N+1}$ exist on an S-shaped curve (a curve having a direction of curvature change from the right to the left or from the left to the right).

On the other hand, if it is determined in the second determining means $M4_1$ (at step S5) that the nodes $N_N$ and $N_{N+1}$ do not exist on the same curve, the passing-state determination amount $\theta_N/L_N$ for the sole node $N_N$ existing on a curve is determined by the third determining means $M4_2$ at step S10 as $$\theta_N/L_N = \theta_N/I_{maxN} \tag{5}$$

Figure 9C:
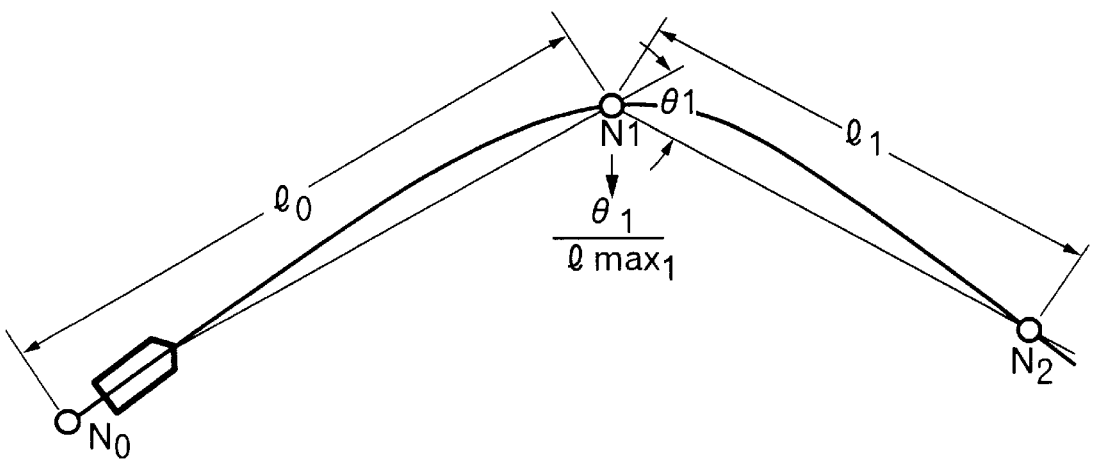

(see FIG. 9C).

At subsequent step S11, a fourth determining reference value $I_{maxN}S$ is calculated using $L_N$ and $L_{N+1}$ in equation (5) according to the following equation:

$$I_{maxN}S = L_N + L_{N+1} \tag{6}$$

The meaning of the fourth determining reference value $I_{maxN}S$ will be described hereinbelow.

Next, at step S12, the direction of the crossed axes angle $\theta_N$ of the node N is compared with the direction of the crossed axes angle $\theta_{N+1}$ of the node $N_{N+1}$. If these directions are the same, it is determined at step S14 that the two nodes $N_N$ and $N_{N+1}$ exist on two different curves which curve in the same direction.

On the other hand, if the crossed axes angles $\theta_N$ and $\theta_{N+1}$ are opposite at step S12, the link length $I_N$ is further compared with the fourth determining reference value $I_{maxN}S$ at step S13. If $I_N \leq I_{maxN}S$, it is determined at step S13 that the two nodes $N_N$ and $N_{N+1}$ exist on two different curves which are curved in the opposite directions.

Figure 10A:
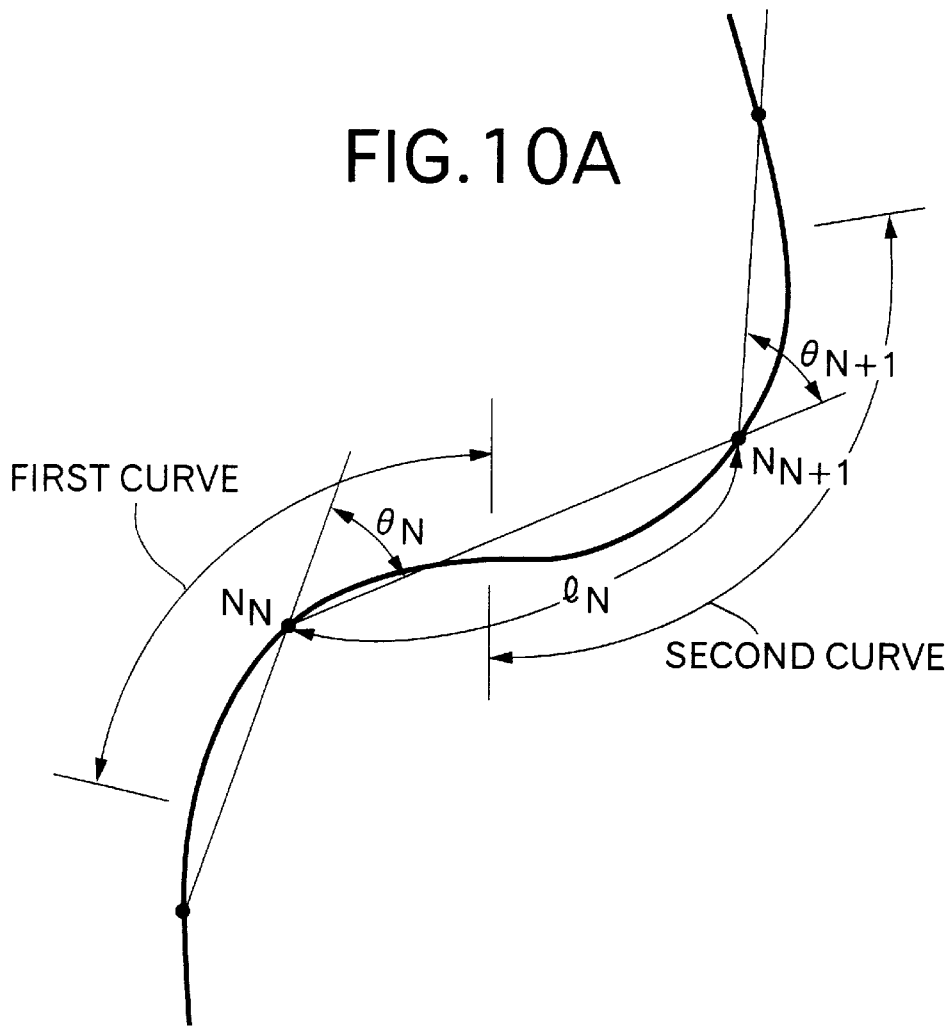
FIGS. 10A and 10B are illustrations explaining step S13 in the flow chart.
Figure 10B:
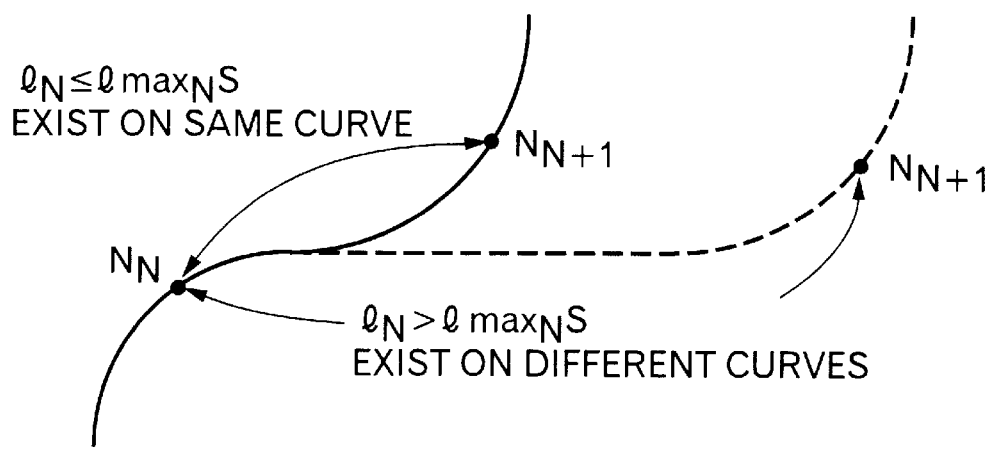

The significance of step S13 is as follows. Suppose that a node $N_N$ exists on a first curve portion of an S-shaped curve made by two continuous arcs in opposite directions and a node $N_{N+1}$ exists on a second curve portion, as shown in FIG. 10A. In this case, a passing-state determination amount $\theta_N/L_N$ in order for the vehicle to pass through the node $N_N$ and a passing-state determination amount $\theta_{N+1}/L_{N+1}$ in order for the vehicle to pass through the node $N_{N+1}$ are $\theta_N/I_{maxN}$ and $\theta_{N+1}/I_{maxN+1}$, respectively, using equation (5). Therefore, when the first and second curve portions are directly continuous to each other in an S-shape, the link length $I_N$ between the nodes $N_N$ and $N_{N+1}$ must be equal to or smaller than $I_{maxN} + I_{maxN+1} = I_{maxN}S$, as shown in FIG. 10B. Conversely, if the link length $I_N$ between the nodes $N_N$ and $N_{N+1}$ exceeds $I_{maxN} + I_{maxN+1} = I_{maxN}S$, the first and second curve portions must be separate curve portions continuous to each other through a straight road portion disposed therebetween.

If the state of the node $N_N$ on the curve is classified into five types at steps S8, S9, S13, S14 and S15 in the above manner (FIG. 5), the passing-state determination amount $\theta_N/L_N$ calculated at steps S6 and S10 is corrected by the first and second correcting means $M4_4$ and $M4_5$ at subsequent step S16.

Figure 11A:
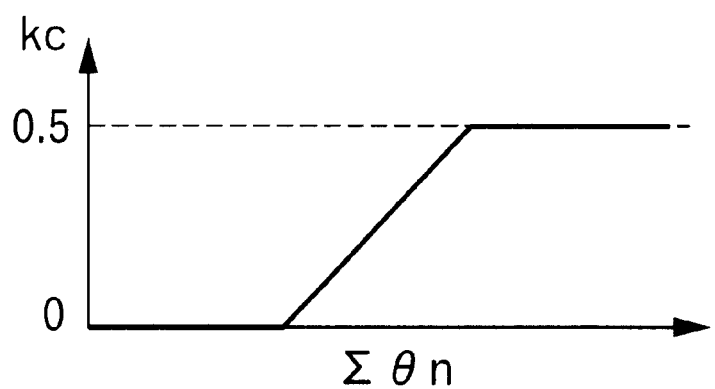

First, the correction carried out by the first correcting means $M4_4$ when a plurality of nodes $N_N$ exist on a simple curve (as shown in step S8) will be described. The passing-state determination amount $\theta_N/L_N$ in this case is calculated at step S6, but even if the calculated value of the passing-state determination amount $\theta_N/L_N$ is the same, it is more difficult for the vehicle to pass, because the total of crossed axes angles $\theta_N$ on the curve is relatively large. The reason can be understood from the fact that even with curves having the same radius of curvature, it is more difficult for the vehicle to pass through the curve with the direction of movement of the vehicle being changed through 90°, than for the vehicle to pass through the curve with the direction of movement of the vehicle being changed through 30°. Thereupon, a sum $\Sigma\theta_N$ of crossed axes angles $\theta_N$ of a plurality of nodes $N_N$ existing on the curve is calculated as shown in FIG. 11A, and a correcting factor $K_C$ is searched from a map, using this sum $\Sigma\theta_N$ as a parameter. Then, using the correcting factor $K_C$, the passing-state determination amount $\theta_N/L_N$ is corrected according to the following expression:

$$\theta_N/L_N \leftarrow (\theta_N/L_N) \times (1+K_C) \tag{7}$$

As the sum $\Sigma\theta_N$ of the crossed axes angles $\theta_N$ is increased, the correcting factor $K_C$ is increased from 0.0 to 0.5. Therefore, the maximum corrected passing-state determination amount $\theta_N/L_N$ is 1.5 times the original passing-state determination amount $\theta_N/L_N$, whereby the value of the passing-state determination amount $\theta_N/L_N$ is compensated to take into account the difficulty of passage when the vehicle actually passes through the curve.

Figure 11B:
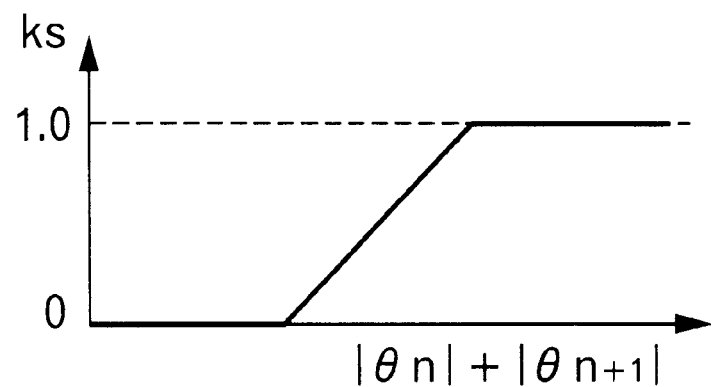
Figure 12A:
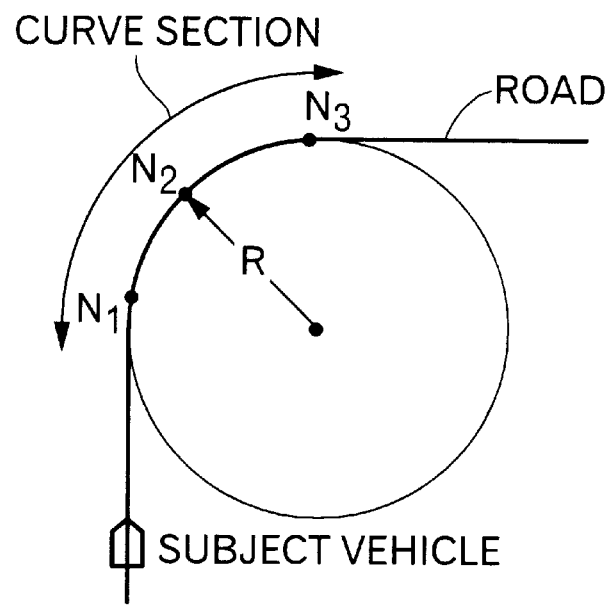
FIGS. 12A and 12B illustrate shortcomings in the prior art.
Figure 12B:
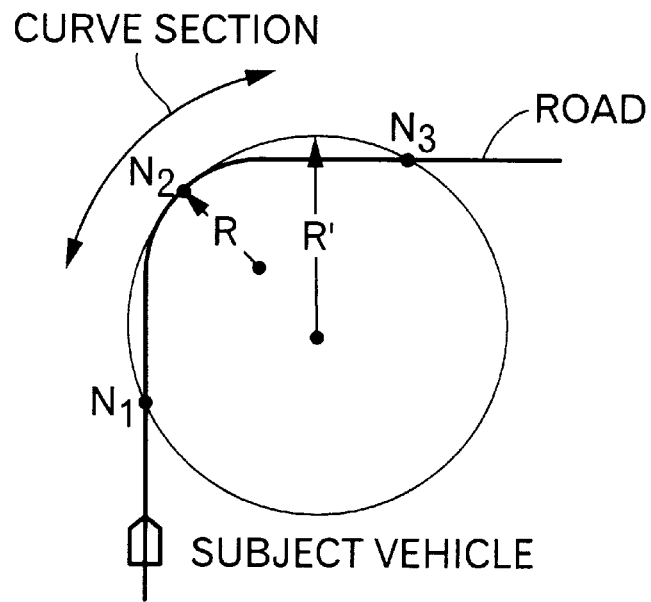
Figure 13A:
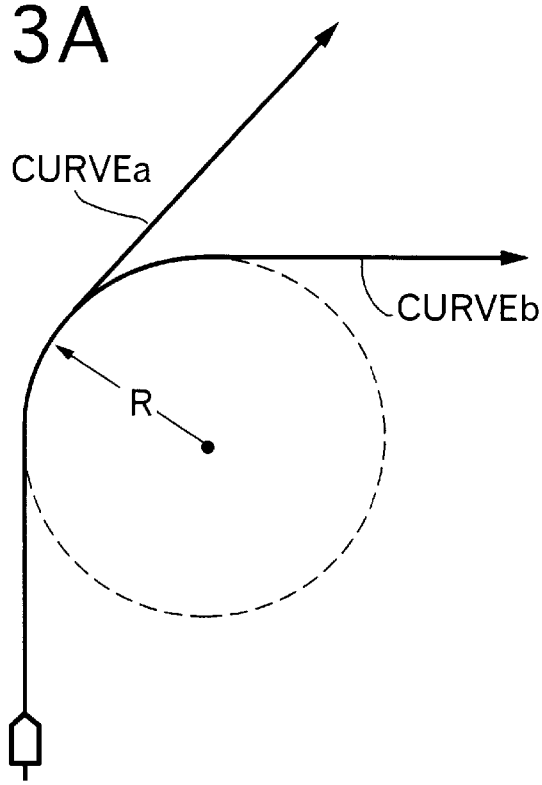
FIGS. 13A and 13B illustrate shortcomings in the prior art.
Figure 13B:
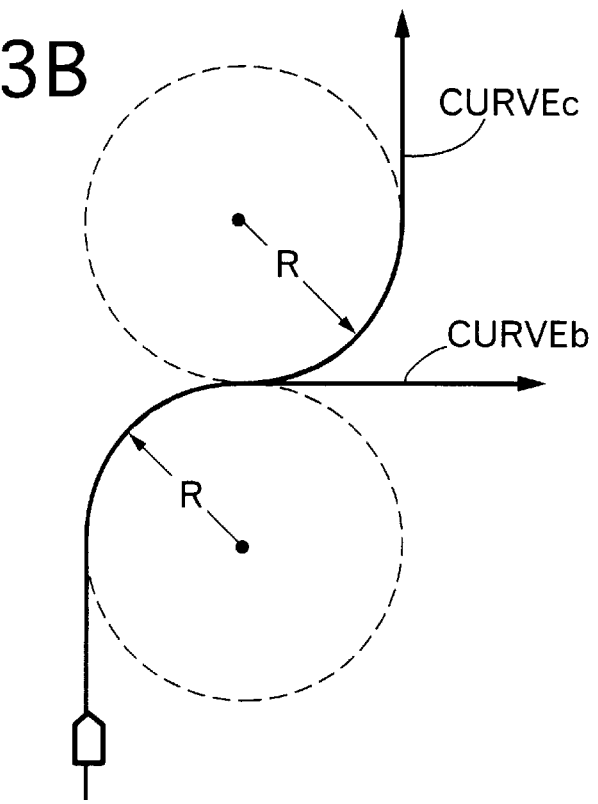

The correction carried out by the second correcting means $M4_5$ when two nodes $N_N$ and $N_{N+1}$ exist on an S-shaped curve (as shown in steps S9 and S13) will be described below. The passing-state determination amount $\theta_N/L_N$ in this case is calculated at steps S6 and S10, but even if the calculated values of the passing-state determination amounts $\theta_N/L_N$ are the same, it is more difficult for the vehicle to pass through the S-shaped curve than to pass through a curve curved in only one direction. Thereupon, a correcting factor $K_S$ is searched from the map, using, as a parameter, a sum $|\theta_N| + |\theta_{N+1}|$ of the absolute values of the crossed axes angles $\theta_N$ and $\theta_{N+1}$ of the two nodes $N_N$ and $N_{N+1}$, as shown in FIG. 11B. Then, the passing-state determination amount $\theta_N/L_N$ is corrected using the correcting factor $K_S$ according to the following expression:

$$\theta_N/L_N \leftarrow (\theta_N/L_N) \times (1+K_S) \tag{8}$$

As the sum $|\theta_N| + |\theta_{N+1}|$ of the absolute values of the crossed axes angles $\theta_N$ and $\theta_{N+1}$ is increased, the correcting factor $K_S$ is increased from 0.0 to 1.0. Therefore, the maximum corrected passing-state determination amount $\theta_N/L_N$ is 2.0 times the original passing-state determination amount $\theta_N/L_N$, whereby the value of the passing-state determination amount $\theta_N/L_N$ can be compensated to take into account the difficulty of passage when the vehicle actually passes through the curve.

A yaw rate YR of the vehicle at a node $N_N$ is given by $\theta_N/t$ resulting from division of the crossed axes angle $\theta_N$ which is an amount of variation in direction of movement of the vehicle by a time t required to generate such yaw rate. The time t is given by $I_N/V$ resulting from division of the link length $I_N$ by a vehicle speed V at which the vehicle passes therethrough. By combining these equations, a final yaw rate YR is calculated as a product of the passing-state determination amount $\theta_N/L_N$ and the vehicle speed V. Yaw rate YR is thus seen as:

$$YR=\theta_N/t=\theta_N/(l_N/V)=(\theta_N/l_N)\times V \tag{8}$$

In addition, a lateral acceleration G of the vehicle is given by a product of the yaw rate YR and the vehicle speed V.

$$G=YR\times V \tag{10}$$

Thus, the vehicle speed V is calculated at step S17 according to the following equation:

$$V=\{G/(\theta_N/L_N)\}^{1/2} \tag{11}$$

given from the equations (9) and (10). Equation (11) for vehicle speed indicates that if a preset limit lateral acceleration G permissible when the vehicle passes through a curve is defined, a passable speed $V_{maxN}$ for passage of the vehicle through the curve is provided based on the preset limit lateral acceleration G and the passing-state determination amount $\theta_N/L_N$. The passable speed $V_{maxN}$ is a maximum vehicle speed at which the vehicle can pass through the curve with a lateral acceleration of the vehicle not exceeding the preset limit lateral acceleration G.

On the other hand, a passage-predicting speed $V_N$ for passage of the vehicle through the node $N_N$, when it is supposed that the vehicle has been decelerated at a reference deceleration β from the subject vehicle position P, is calculated at step S18 according to the following equation:

$$V_N=(V^2-2\beta S_N)^{1/2} \tag{12}$$

wherein $S_N$ represents a distance from the position P of the subject vehicle to the node $N_N$.

At subsequent step S19, the passage-predicting speed $V_N$ is compared with the passable speed $V_{maxN}$. If $V_N \leq V_{maxN}$, it is determined that the vehicle can pass through the node $N_N$. If $V_N > V_{maxN}$, it is determined that it is difficult for the vehicle to pass through the node $N_N$. When it is determined that it is difficult for the vehicle to pass through the node $N_N$, the warning means M9 is operated at step S20 to alert the driver to decelerate the vehicle, and at the same time the vehicle speed regulating means M10 is operated to automatically decelerate the vehicle. Thus, the spontaneous braking by the driver or the automatic deceleration is performed to reduce the vehicle speed, thereby enabling the vehicle to safely and reliably pass through the curve.

When it is determined at steps S3 and S4 that the node $N_N$ exists on the curve, as described above, the passing-state determination amount $\theta_N/L_N$ for passage through the node $N_N$ existing on the curve is calculated. The present system avoids the unnecessary calculation of passing state determination amount $\theta_N/L_N$ when the vehicle travels on a straight road section, thereby reducing calculation load and the size of the electronic control unit (ECU). In addition, since the determination of whether the vehicle can pass is carried out using the passing-state determination amount $\theta_N/L_N$ which is a parameter accurately representing a degree of difficulty in the passage of the vehicle through the node, even if only one node or two nodes $N_N$ exist on a curve, the determination of whether the vehicle can pass through the node or nodes can be correctly performed.

Although the embodiment of the present invention has been described in detail, it will be understood that the present invention is not limited to the above-described embodiment, and various modifications may be made without departing from the spirit and scope of the invention defined in claims.

For example, the passable speed $V_{maxN}$ has been calculated based on the preset limit lateral acceleration G in the embodiment, but the passable speed $V_{maxN}$ may be calculated based on the preset limit yaw rate YR in place of the preset limit lateral acceleration G. In other words, the passable speed $V_{maxN}$ may be calculated from the equation (9) according to the following equation:

$$V_{maxN}=YR/(\theta_N/L_N) \tag{13}$$

Even when a required number of nodes $N_N$ do not exist within the searching section, the determination of the road shape can be performed without hindrance, if the coordinates of the subject vehicle position P are utilized as the coordinates of a single node.

The scope of the invention is indicated by the appended claims, rather than by the foregoing discussion of presently preferred embodiments.

What is claimed is:

1. A system for determining the passability of a vehicle, comprising map information means for outputting map information as an aggregation of a plurality of nodes constituting a road section, subject-vehicle position detecting means for detecting a position of a subject vehicle on a map, road-shape determining means for determining the shape of a road based on a node ahead of the subject vehicle position, and passability determining means for determining whether the vehicle can pass through said node ahead of the vehicle, based on the determined shape of the road, said road-shape determining means including first determining means for determining whether said node exists on a curve or on a straight road, second determining means for determining whether another node exists on the curve, third determining means for determining whether said curve is a simple curve or an S-shaped curve, and fourth determining means for determining whether said curve is an S-shaped curve, when it is determined by said second determining means that said node exists alone on the curve.

2. A system according to claim 1, wherein said first determining means performs said determination based on an amount of variation in azimuth angle of the vehicle and a distance of movement of the vehicle, which are calculated from coordinates of at least three consecutive nodes, said amount of variation in azimuth angle being calculated as an angle formed by line segments each connecting adjacent nodes, said distance of movement of the vehicle being calculated based on a distance between adjacent nodes.

3. A system according to claim 2, wherein coordinates for a position of the subject vehicle are used in place of coordinates for a node.

4. A system according to claim 1, wherein said second determining means performs said determination based on an amount of variation in azimuth angle of the vehicle and a distance of movement of the vehicle, said amount of angle variation and said distance being calculated from coordinates of at least three consecutive nodes, said amount of variation in azimuth angle being calculated as an angle formed by line segments each connecting adjacent nodes, and said distance of movement of the vehicle being calculated based on a distance between adjacent nodes.

5. A system according to claim 4, wherein coordinates for a position of the subject vehicle are used in place of coordinates for a node.

6. A system according to claim 1, wherein said third determining means performs said determination based on an amount of variation in azimuth angle of the vehicle and a distance of movement of the vehicle, which are calculated from coordinates of at least four consecutive nodes, said amount of variation in azimuth angle being calculated as an angle formed by line segments each connecting adjacent nodes, said distance of movement of the vehicle being calculated based on a distance between adjacent nodes.

7. A system according to claim 6, wherein coordinates for a position of the subject vehicle are used in place of coordinates for a node.

8. A system according to claim 7, wherein said amount of variation in azimuth angle of the vehicle is calculated as an angle formed by line segments each connecting adjacent nodes, and wherein said road shape determining means determines whether said road shape is substantially S-shaped based upon a comparison of signs of said amount of variation in azimuth angles of adjacent nodes along said road.

9. A system according to claim 1, wherein said fourth determining means performs said determination based on an amount of variation in azimuth angle of the vehicle and a distance of movement of the vehicle, said angle variation amount and said distance being calculated from coordinates of at least four consecutively disposed nodes, said amount of variation in azimuth angle being calculated as an angle formed by line segments each connecting adjacent nodes, said distance of movement of the vehicle being calculated based on a distance between adjacent nodes.

10. A system according to claim 9, wherein coordinates for a position of the subject vehicle are used in place of coordinates for a node.

11. A system according to claim 1, wherein coordinates for a position of the subject vehicle are used in place of coordinates for a node.

12. A system for determining the passability of a vehicle, comprising map information outputting means for outputting map information as an aggregation of a plurality of nodes constituting a road section, subject vehicle position detecting means for detecting a position of a subject vehicle on a map, road-shape determining means for determining a shape of a road based on an arrangement of nodes ahead of said subject vehicle position, passable speed calculating means for calculating a passable speed enabling the vehicle to pass through said nodes ahead of the subject vehicle position, passability determining means for determining whether the vehicle can pass through said nodes, based on said passable speed, and correcting means for correcting a passable speed for the vehicle, wherein when said determined shape of the road is a simple curve, said correcting means corrects said vehicle passable speed based on a sum total of amount of variation in azimuth angle of the vehicle from an inlet to an outlet of said simple curve.

13. A system according to claim 12, wherein said amount of variation in azimuth angle of the vehicle is calculated as an angle formed by line segments each connecting adjacent nodes.

14. A system for determining the passability of a vehicle, comprising map information outputting means for outputting map information as an aggregation of a plurality of nodes constituting a road section, subject vehicle position detecting means for detecting a position of a subject vehicle on a map, road-shape determining means for determining a shape of a road based on an arrangement of nodes positioned ahead of said subject vehicle position, passable speed calculating means for calculating a passable speed enabling the vehicle to pass through a node ahead of said subject vehicle position, passability determining means for determining whether the vehicle can pass through said nodes positioned ahead of said subject vehicle position based on said passable speed, and correcting means for correcting said passable speed when said determined shape of the road is an S-shaped curve.

* * * * *

UNITED STATES PATENT AND TRADEMARK OFFICE
CERTIFICATE OF CORRECTION

PATENT NO : 6,163,741
DATED : 19 December 2000
INVENTOR(S): Shohei Matsuda, Yuji Sakaki, Makoto Otabe It is certified that error appears in the above-identified patent and that said Letters Patent are hereby corrected as shown below:

In the drawings, on FIGS. 11A and 11B, change "$\theta_n$" to --$\theta_N$--.

Column 1, line numbered between 48 and 49, after "such" insert --that--.

Column 2, line 2, change "a disclosed a" to --disclosed a--.

Column 3, line 47, change "$I_N$" to --$l_N$--;
    line 57, change "$K_C$ and $K_S$" to --kc and ks--.

Column 4, line numbered between 43 and 44, change "limir" to --limit--.

Column 5, line 19, change "curie" to --curve--;
    line numbered between 31 and 32, change "length $1_N$" to --length $l_N$--;
    line numbered between 33 and 34, change "length $1_N$" to --length $l_N$--;
    line numbered between 37 and 38, change "length $1_N$" to --length $l_N$--;
    line numbered between 43 and 44, change "$\theta_N/1_N$" to --$\theta_N/l_N$--;
    line numbered between 44 and 45, change "$\theta_N/1_N$" to --$\theta_N/l_N$--;
    line numbered between 45 and 46, change "$\phi_{ref}$" to --$\psi_O$--;
    line numbered between 46 and 47, change "$\theta_N/1_N \geq \phi_{ref}$" to --$\theta_N/l_N \geq \psi_O$--;
    line numbered between 47 and 48, change "$\theta_N/1_N$" to --$\theta_N/l_N$--;
    line numbered between 50 and 51, change "$\theta_N/1_N$" to --$\theta_N/l_N$--;
    line numbered between 51 and 52, change "$\theta_N/1_N$" to --$\theta_N/l_N$--;
    line numbered between 52 and 53, change "$\theta_N/1_N < \phi_{REF}$" to --$\theta_N/l_N < \psi_O$--;
    line 59, change "$\theta_N/1_N < \phi_{REF}$" to --$\theta_N/l_N < \psi_O$--.

UNITED STATES PATENT AND TRADEMARK OFFICE
CERTIFICATE OF CORRECTION

PATENT NO : 6,163,741
DATED : 19 December 2000
INVENTOR(S): Shohei Matsuda, Yuji Sakaki, Makoto Otabe It is certified that error appears in the above-identified patent and that said Letters Patent are hereby corrected as shown below:

Column 6, line 2, change "$I_N$" to --$l_N$--;

line 3, change "value $I_{maxN}$" to --value $l_{maxN}$--; change "$I_N \leq I_{maxN}$" to --$l_N \leq l_{maxN}$--;

line 5, change "$I_N > I_{maxN}$" to --$l_N > l_{maxN}$--;

13th line, change "$<N_N ON_{N+1}$" to --$\angle N_N ON_{N+1}$--;

14th line, change "length $I_N$" to --length $l_N$--;

approximately line 17, in equation (1), change "$I_N$" to --$l_N$--;

line 21, change "length $I_N$" to --length $l_N$--;

line 27, change "length $I_N$" to --length $l_N$--;

line 30, change "length $I_N$" to --length $l_N$--;

line 31, change "$I_{maxN}$" to --$l_{maxN}$--;

approximately line 34, in equation (2), change "$I_{maxN}$" to --$l_{maxN}$--;

line 35, change "$I_N \leq I_{maxN}$" to --$l_N \leq l_{maxN}$--;

line 37, change "$I_N \leq I_{maxN}$" to --$l_N \leq l_{maxN}$--;

approximately line 48, in the equation, change "$\theta_K/L_K - \theta_K/I_K$" to --$\theta_K/L_K - \theta_K/l_K$ (3)--;

approximately line 52, in equation (4), change "$I_{N-1}$" to --$l_{N-1}$-- and change "$I_{maxN}$" to --$l_{maxN}$--;

line 54, change "$I_{maxN}$" to --$l_{maxN}$--;

line 59, change "$\theta_1/I_1$" to --$\theta_1/l_1$--;

line 60, change "$\theta_2/(I_2$" to --$\theta_2/(l_2$--;

UNITED STATES PATENT AND TRADEMARK OFFICE
CERTIFICATE OF CORRECTION

PATENT NO : 6,163,741
DATED : 19 December 2000
INVENTOR(S): Shohei Matsuda, Yuji Sakaki, Makoto Otabe It is certified that error appears in the above-identified patent and that said Letters Patent are hereby corrected as shown below:

Column 6 (continued), line 61, change "$I_{max2}$" to --$l_{max2}$--;
  line 65, change "$\theta_1/I_1$" to --$\theta_1/l_1$-- and change "$\theta_2/I_2$" to --$\theta_2/l_2$--;
  line 67, change "$I_2$" to --$l_2$-- and change "$I_{max3}$" to --$l_{max3}$--.

Column 7, approximately line 21, in equation (5), change "$I_{maxN}$" to --$l_{maxN}$--;
  line 25, change "$I_{maxN}S$" to --$l_{maxN}S$--;
  approximately line 28, in equation (6), change "$I_{maxN}S$" to --$l_{maxN}S$--;
  line numbered between 30 and 31, change "$I_{maxN}S$" to --$l_{maxN}S$--;
  line 39, change "$I_N$" to --$l_N$--;
  line 41, change "$I_{maxN}S$" to --$l_{maxN}S$-- and change "$I_N \leq I_{maxN}S$" to --$l_N \leq l_{maxN}S$--;
  line 51, change "$I_{maxN}$" to --$l_{maxN}$--;
  line 52, change "$I_{maxN+1}$" to --$l_{maxN+1}$--;
  line 55, change "$I_N$" to --$l_N$--;
  line 56, change "$I_{maxN} + I_{maxN+1} = I_{maxN}S$" to --$l_{maxN} + l_{maxN+1} = l_{maxN}S$--;
  line 57, change "$I_N$" to --$l_N$--;
  line 58, change "$I_{maxN} + I_{maxN+1} = I_{maxN}S$" to --$l_{maxN} + l_{maxN+1} = l_{maxN}S$--.

Column 8, line numbered between 17 and 18, change "$K_C$" to --kc--;
  line numbered between 19 and 20, change "$K_C$" to --kc--;
  approximately line 24, in equation (7), change "$K_C$" to --kc--;
  line numbered between 26 and 27, change "$K_C$" to --kc--;
  line 43, change "$K_S$" to --ks--;

UNITED STATES PATENT AND TRADEMARK OFFICE
CERTIFICATE OF CORRECTION

PATENT NO : 6,163,741
DATED : 19 December 2000
INVENTOR(S): Shohei Matsuda, Yuji Sakaki, Makoto Otabe It is certified that error appears in the above-identified patent and that said Letters Patent are hereby corrected as shown below:

Column 8 (continued), line 47, change "$K_S$" to --ks--;
      line 50, in equation (8), change "$K_S$" to --ks--;
      line 54, change "$K_S$" to --ks--;
      line 65, change "$I_N/V$" to --$l_N/V$--;
      line 66, change "$I_N$" to --$l_N$--.

Column 9, approximately line 6, in the equation, change "$I_N$" to --$l_N$-- (both occurrences); change "(8)" to --(9)--.

Signed and Sealed this

Twenty-ninth Day of May, 2001

NICHOLAS P. GODICI

*Attest:*

*Attesting Officer*     *Acting Director of the United States Patent and Trademark Office*